(12) United States Patent
Bousselet et al.

(10) Patent No.: US 6,466,345 B1
(45) Date of Patent: Oct. 15, 2002

(54) MULTIPLE WAVELENGTH SOURCE

(75) Inventors: Philippe Bousselet, Leudeville; Serge Artigaud, Draveil; Jean-Luc Beylat, Antony, all of (FR)

(73) Assignee: Alcatel N.V., Paris (FR)

( * ) Notice: Subject to any disclaimer, the term of this patent is extended or adjusted under 35 U.S.C. 154(b) by 0 days.

(21) Appl. No.: 08/651,747

(22) Filed: May 22, 1996

(30) Foreign Application Priority Data

May 24, 1995 (FR) .............................................. 95 06221

(51) Int. Cl.[7] .................................................. H04J 14/02
(52) U.S. Cl. ........................................ 359/130; 359/127
(58) Field of Search ................................. 359/114, 115, 359/127, 129, 130, 134; 385/10, 37, 39, 47

(56) References Cited

U.S. PATENT DOCUMENTS

| | | | | |
|---|---|---|---|---|
| 4,923,271 A | * | 5/1990 | Henry et al. | 385/37 |
| 5,283,686 A | | 2/1994 | Huber | |
| 5,426,297 A | * | 6/1995 | Dunphy et al. | 250/227 |
| 5,457,760 A | * | 10/1995 | Mizrahi | 385/37 |
| 5,510,920 A | * | 4/1996 | Ota | 359/121 |
| 5,557,442 A | * | 9/1996 | Huber | 359/179 |
| 5,563,732 A | * | 10/1996 | Erdogan et al. | 359/311 |
| 5,579,143 A | * | 11/1996 | Huber | 359/130 |

FOREIGN PATENT DOCUMENTS

| | | | |
|---|---|---|---|
| EP | 0524558 A3 | 1/1993 | |
| EP | 0564098 A3 | 10/1993 | |
| WO | WO 9118434 | 11/1991 | |

OTHER PUBLICATIONS

D. Bayart et al, "Experimental investigation of the gain flatness characteristics for 1.55 μm Erbiumdoped fluoride fiber amplifiers", *IEEE Photonics Technology Letters*, vol. 6, No. 5, May 1994, NY, pp. 613–615.

J. S. Lee et al, "Spectrum–Sliced Fiber Amplifier Light Source for Multichannel WDM Applications", *IEEE Photonics Technology Letters*, vol. 5, No. 12, Dec. 1, 1993, pp. 1458–1461.

J. S. Lee et al, "Bandwidth Optimization of a Spectrum–Sliced Fiber Amplifier Light Source Using an Angle–Tuned Fabry Perot Filer and a Double–Stage Structure", *IEEE Photonics Technology Letters*, vol. 6, No. 10, 1 October 1994, pp. 1997–1199.

\* cited by examiner

*Primary Examiner*—Jason Chan
(74) *Attorney, Agent, or Firm*—Sughrue Mion, PLLC

(57) ABSTRACT

Multiple wavelength source, in particular for optical communication employing a plurality of wavelength multiplexed channels, comprising a broadband light source (2) coupled to a discrete wavelength separator (3).

The wavelength separator means (3) compromises cascaded refractive Bragg gratings (14, 15, 16, 17) each reflecting a discrete wavelength ($\lambda n, \ldots, \lambda 3, \lambda 2, \lambda 1$) to a source output (20).

10 Claims, 1 Drawing Sheet

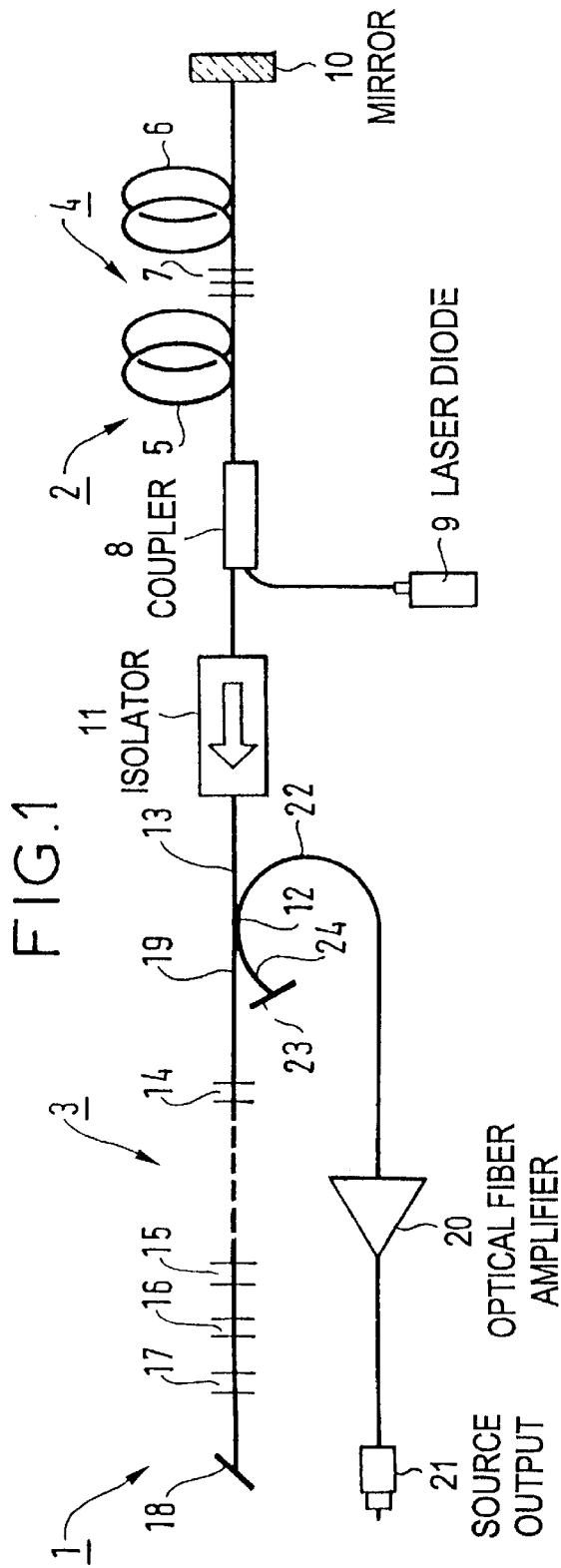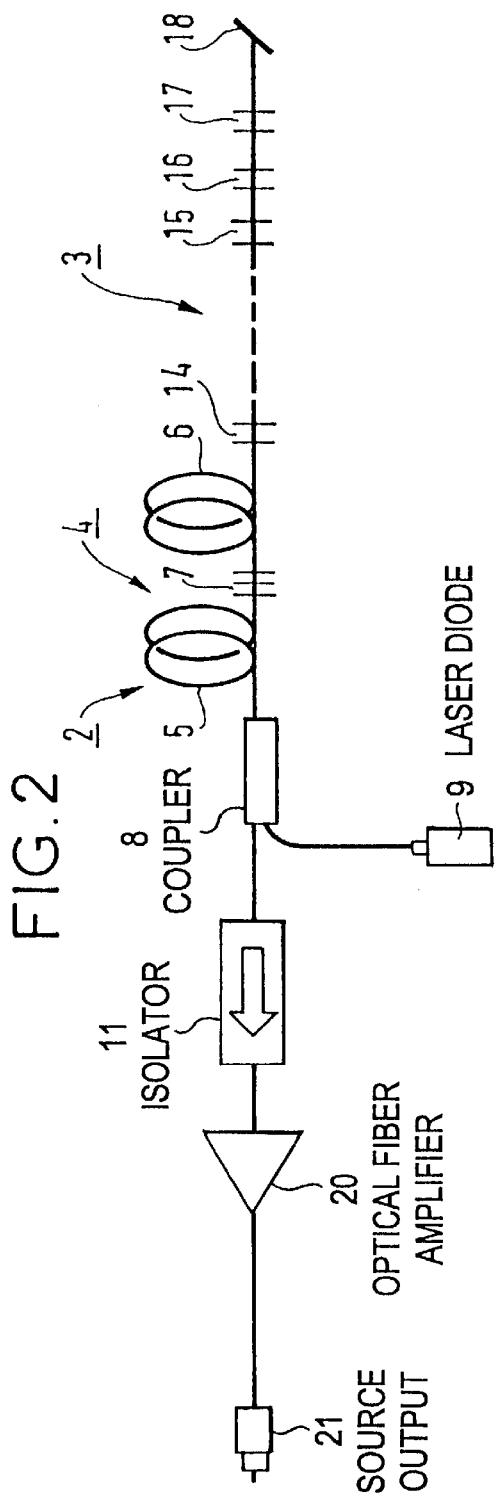

MULTIPLE WAVELENGTH SOURCE

BACKGROUND OF THE INVENTION

The present invention concerns a multiple wavelength source, in particular for optical communication using a plurality of wavelength multiplexed channels, comprising a broadband light source coupled to discrete wavelength separator means.

There is a trend in optical communication systems to use wavelength multiplexing which enables a plurality of communication channels to be conveyed on a common optical transmission medium. Each channel consists of a source of a particular wavelength that is modulated by the information to be transmitted on that channel, coupled to others on a common medium, usually an optical fiber, and then separated from the other channels and demodulated to constitute the transmitted information.

Transmitting a plurality of multiplexed channels requires the carrier wavelengths of the various channels to be precisely defined in the spectrum and to have a high spectral purity.

Initially, the technology offered only independent sources, in particular laser diodes, to generate the wavelengths of the various channels. Apart from the high initial cost of a multiplicity of sources, this solution is also unsatisfactory in that independent sources respond independently of each other to their conditions of use, leading to high additional costs for initially setting and subsequently maintaining the adjustment of each source.

Consideration has therefore been given to obtaining the wavelengths of the various channels from a single source, in order to obtain at least uniform behavior of a source of multiple wavelengths, so that the adjustment mentioned can be simplified.

The principle of a solution of this kind is described in the article "Spectrum-Sliced Fiber Amplifier Light Source for Multichannel WDM Applications" by J. S. Lee and Y. C. Chung published in IEEE Photonics Technology Letters, Vol. 5, No. 12, December 1993.

This solution employs a broadband light source coupled to discrete wavelength separator means. After mentioning light-emitting diode and superluminescent light sources, the article recommends the use of a spontaneous emission amplifier consisting of an erbium doped optical fiber pumped at 1.48 $\mu$m in series with an isolator to prevent any laser effect.

The wavelength separator means are not described, but merely shown as a wavelength demultiplexer, i.e., broadly speaking, as a set of filters driven in parallel and supplying selected wavelengths at individual outputs. This provides only limited selectivity and spectral purity and introduces high losses for each of the selected wavelengths.

The system, not yet implemented experimentally, could provide about 20 channels separated by 0.6 nm.

SUMMARY OF THE INVENTION

The present invention is aimed at improving a solution of this kind to provide a greater number of channels at substantially reduced cost, providing selected discrete wavelengths at a significantly higher power level.

In accordance with the invention, the multiple wavelength source defined at the beginning of this text is characterized in that said wavelength separator means comprise cascaded refractive Bragg gratings each reflecting one of said discrete wavelengths to a source output.

Said additional means preferably comprise an absorbent termination after the last of the refractive Bragg gratings.

The set of refractive Bragg gratings therefore reflects the set of discrete wavelengths selectively. A signal made up of only the wanted wavelengths is thus obtained directly. Each wavelength is narrowly selected and therefore has high spectral purity. Because of the absence of intermediate wavelengths between the wavelengths selected in this way, their subsequent spatial separation is facilitated.

In one embodiment of the invention said refractive gratings are disposed at the output of said light source and select said discrete wavelengths in the broadband spectrum that the latter produces.

A directional coupler routes the broadband emission towards the cascade of Bragg gratings and the absorbent termination that terminates it and routes the reflected wavelengths towards said source output.

The coupler is advantageously located at the output of said light source.

An optical isolator is advantageously disposed between said source and said directional coupler.

Said light source is preferably an erbium-doped fluoride-based optical fiber.

The end of said light source opposite its output is advantageously terminated by a mirror.

In another embodiment, the end of said light source opposite its output is coupled to said cascade of Bragg gratings terminated by said absorption means.

Spontaneous emission amplified by passing twice through the fiber is thus favored at the wavelengths reflected by said cascaded Bragg gratings.

The various objects and features of the present invention will emerge more clearly from the following description of one embodiment of the invention given by way of non-limiting example with reference to the appended figures.

BRIEF DESCRIPTION OF THE DRAWINGS

FIG. 1 is a diagrammatic representation of a multiple wavelength source of the present invention.

FIG. 2 is a diagrammatic representation of an alternative embodiment of the multiple wavelength source from FIG. 1.

DETAILED DESCRIPTION

The multiple wavelength source 1 in FIG. 1 can be used for optical communication employing a plurality of wavelength multiplexed channels, for example. It essentially comprises:

a broadband light source 2, and discrete wavelength separator means 3.

The light source 2 comprises:

a spontaneous emission amplifying optical fiber 4 in two sections 5 and 6 with a filter 7 between them equalizing the spontaneous emission level of the fiber 4; this fiber is an erbium-doped fluoride-based optical fiber like that described in "Experimental investigations of the gain flatness characteristics for 1.55 $\mu$m fluoride-based erbium-doped fibre amplifiers" by D. Bayard, B. Clesca, L. Hamon and J-L. Beylat, published in IEEE Photonic Technology Letters, Vol. 6, No. 5, 613 (1994).

a coupler 8 for coupling 1,480 nm pumping radiation from a laser diode 9, which may be for example a 100 mW or 140 mW diode sold by ALCATEL OPTRONICS under the product reference A 1948 PLM 85, a mirror 10 reflecting all of the radiation produced by the light source 2, an isolator 11 preventing any radiation reflected from the downstream end reaching the fiber 4 and so favoring some wavelengths only by the laser effect.

The pump radiation passes twice through the fiber 4, from the coupler 8 to the mirror 10 and returns and generates, by spontaneous emission amplified by passing twice through the erbium-doped fluoride-based fiber, radiation at wavelengths between 1,530 nm and 1,570 nm, with an overall power of 40 mW, not optimized, distributed relatively uniformly because of the additional effect of the filter 7. This radiation passes through the coupler 8 and the isolator 11 to the discrete wavelength separator means 3.

The discrete wavelength separator means 3 comprise:
- a 3 dB directional coupler 12, the output of the isolator 11 being connected to an input-side port 13 of the latter,
- cascaded refractive Bragg gratings 14, 15, 16, 17 each reflecting a discrete wavelength λn, . . . , λ3, λ2, λ1, followed by an absorbent termination 18 connected to an output-side port 19 of the coupler 12 and reflecting towards these ports energy at the aforementioned discrete wavelengths contained in the radiation from the light source 2,
- a source output 21 connected to another input-side port of the coupler 12; this source output is preceded by an optical fiber amplifier 20 also using an erbium-doped fluoride-based optical fiber and therefore compatible with the light source 2,
- an absorbent termination 23 connected to a second output-side port 24 of the coupler 12.

The radiation from the source 2 is equally divided by the coupler 12 between its two output-side ports 19 and 24. The termination 23 absorbs the radiation sent to the output-side port 24. However, the refractive gratings 14, 15, 16, 17 each return towards the coupler a discrete wavelength λn, . . . , λ3, λ2, λ1. The wavelengths selected in this way are divided equally by the coupler 12 between its two input-side ports 13 and 22. The energy supplied to the port 13 is absorbed by the isolator 11. That supplied to the port 22 is amplified by the amplifier 20 and fed to the source output 21. The separator means of the invention thus select and spectrally separate with minimal attenuation discrete wavelengths that can be amplified in common before they are spatially separated.

To be more precise, the cascade of refractive filters of the invention offers the advantage of no limitation on the number of channels, since these filters are virtually transparent to wavelengths other than that which each of them reflects, while the efficiency of reflection is very high (at most 0.2 dB of loss by reflection). By comparison, the best optical wavelength multiplexing/demultiplexing components currently available, which include the 1×8 multiplexer sold by JOBIN YVON, using a STIMAX grating, for example are limited in terms of the number of channels (18 at most in the relevant band) and introduce much more attenuation (at least 3 dB of loss per channel). They are also relatively costly.

FIG. 2 shows an alternative form of the multiplex wavelength source from FIG. 1. Components also included in FIG. 1 retain the same reference numbers in FIG. 2.

FIG. 2 therefore shows a light source 2 and wavelength separator means 3, the latter comprising a cascade of refractive gratings 14, 15, 16, 17 followed by an absorbent termination 18, an erbium-doped fluoride-based amplifying optical fiber 4 in two sections 5 and 6 separated by a filter 7, the pump coupler 8 and the pump diode 9, the isolator 11, the amplifier 20 and the output 21.

The mirror 10 from FIG. 1 is replaced by the refractive gratings 14, 15, 16, 17, as it were, the latter having the same function of reinforcing the spontaneous emission amplified by the amplifier 4, but selectively, to the benefit of each of the discrete wavelengths λn, . . . , λ3, λ2, λ1. Accordingly, essentially only the wavelengths generated in this way are transmitted to the amplifier 20 from the output of the light source 2, i.e. from the isolator 11.

A solution of this kind eliminates one coupler and the losses that it introduces, but the channels have a lower spectral purity, which may be sufficient in some applications.

We claim:

1. A multiple wavelength source, in particular for optical communication employing a plurality of wavelength multiplexed channels, comprising:
   a broadband light source (2);
   discrete wavelength separator means (3) coupled to said broadband light source, wherein said wavelength separator means (3) comprises cascaded refractive Bragg gratings (14, 15, 16, 17) each reflecting one discrete wavelength ($\lambda_n$, . . . $\lambda_3$, $\lambda_2$, $\lambda_1$) toward a source output (21); and
   diverting means for guiding said reflected wavelengths toward said source output and preventing said reflected wavelengths from reaching said broadband light source, wherein said diverting means includes an optical isolator (11) inserted between said light source and a directional coupler (12).

2. Multiple wavelength source according to claim 1 characterized in that said refractive gratings (14, 15, 16, 17) are disposed at the output of said light source (2) and select said discrete wavelengths (λn, . . . , λ3, λ2, λ1) in the broadband spectrum that the latter produces.

3. Multiple wavelength source according to claim 2 characterized in that additional means (18) are provided to absorb the radiation not reflected by said cascaded refractive gratings (14, 15, 16, 17).

4. Multiple wavelength source according to claim 3 characterized in that said additional means (18) are in the form of an absorbent termination (18) disposed on the output side of the last of the refractive Bragg gratings (17).

5. Multiple wavelength source according to claim 2 wherein said directional coupler (12) routes the broadband emission towards the cascade of refractive gratings (14, 15, 16, 17) and the absorbent termination (18) on their output side and routes the wavelengths reflected by said refractive gratings towards said source output (20).

6. Multiple wavelength source according to claim 5 characterized in that said coupler is at the output of said light source (2).

7. Multiple wavelength source according to claim 1 characterized in that said light source (2) comprises an erbium-doped fluoride-based optical fiber (4).

8. Multiple wavelength source according to claim 7 characterized in that said light source (2) comprises two sections of fibers between which is inserted a level equalizing filter (7).

9. Multiple wavelength source according to claim 7 characterized in that the end of said light source (2) opposite its output is terminated by a mirror (10).

10. A multiple wavelength source, in particular for optical communication employing a plurality of wavelength multiplexed channels, comprising:
   a broadband light source (2);
   discrete wavelength separator means (3) coupled to said broadband light source, wherein said wavelength separator means (3) comprises cascaded refractive Bragg gratings (14, 15, 16, 17) each reflecting on discrete wavelength ($\lambda_n$, . . . $\lambda_3$, $\lambda_2$, $\lambda_1$) source output (21); and
   diverting means for guiding said reflected wavelengths toward said source output and preventing said reflected wavelengths from reaching said broadband light source,
   wherein said light source comprises an erbium-doped flouride-based optical fiber (4), and two sections of fibers between which is inserted a level equalizing filter (7).

* * * * *